United States Patent [19]

Inagaki et al.

[11] Patent Number: 4,738,493

[45] Date of Patent: Apr. 19, 1988

[54] AUTOMOBILE ANTISKID HYDRAULIC BRAKING SYSTEM

[75] Inventors: Mitsuo Inagaki; Hideaki Sasaya, both of Okazaki; Kenji Takeda, Nukata; Kazuma Matsui, Toyohashi, all of Japan

[73] Assignees: Nippon Soken, Inc., Nishio; Nippondenso Co., Ltd., Kariya, both of Japan

[21] Appl. No.: 864,490

[22] Filed: May 19, 1986

[30] Foreign Application Priority Data

May 20, 1985 [JP] Japan .................. 60-105928

[51] Int. Cl.$^4$ .............................................. B60T 8/02
[52] U.S. Cl. .................... 303/116; 310/328; 303/119; 417/505
[58] Field of Search ............... 303/113, 116, 119; 417/505; 310/328

[56] References Cited

U.S. PATENT DOCUMENTS 4,603,920 8/1986 Otsuki et al. .................. 303/116
4,629,039 12/1986 Imoto et al. .................. 303/119

FOREIGN PATENT DOCUMENTS 0051645 4/1980 Japan .................. 303/116
58-17169 4/1983 Japan .

Primary Examiner—Duane A. Reger
Assistant Examiner—Matthew C. Graham
Attorney, Agent, or Firm—Cushman, Darby & Cushman

[57] ABSTRACT

Antiskid hydraulic braking system comprising a first shutoff valve operable to shutoff hydraulic pressure from a master cylinder to wheel cylinder as the brakes tend to lock the wheels of a vehicle. Wheel cylinders are connected to a reservoir through a second shutoff valve which relieves hydraulic pressure at the wheel cylinders until the tendency toward wheel lock disappears. The system further comprises an intermittently operable high speed hydraulic pump, such as a piezoelectric pump, which serves to pump the brake fluid in the reservoir to the wheel cylinders to restore hydraulic pressure in the wheel cylinders. The piezoelectric pump comprises a pump plunger having a small diameter head defining a pumping chamber and a large diameter base defining a delivery or pressure chamber. The brake fluid under pressure in the delivery chamber acts upon the plunger base to hydraulically preload the piezoelectric elements.

6 Claims, 3 Drawing Sheets

AUTOMOBILE ANTISKID HYDRAULIC BRAKING SYSTEM

BACKGROUND OF THE INVENTION

1. Field of the Invention

The present invention relates to a hydraulic braking system for motor vehicles and, more particularly, to an antiskid braking system wherein hydraulic pressure applied to wheel cylinders is controlled in response to road surface conditions and vehicle conditions in such a manner that the vehicle is stopped without skidding and at a reduced braking distance while maintaining good steerability of the vehicle.

2. Description of the Related Art

A known antiskid braking system comprises a solenoid operated shutoff valve in a main hydraulic conduit connecting a master cylinder to respective wheel cylinders, the wheel cylinders being, in turn, connected to a reservoir through a three-position solenoid valve, as described later in more detail. The system further includes a hydraulic pump which serves to pump the brake fluid in the reservoir back to the wheel cylinders, the hydraulic pump being designed to be driven by an electric motor coupled thereto. This known system operates as follows. When the brake is applied and a sensing means senses that the brake is about to lock any one of the vehicle wheels, the shutoff valve is closed to interrupt hydraulic pressure being applied by the master cylinder to the wheel cylinders, and simultaneously therewith, the three-position valve is shifted for a predetermined short time interval to a position in which the wheel cylinders are connected to the reservoir so that a small amount of brake fluid in the wheel cylinders is released toward the reservoir, causing the hydraulic pressure in the wheel cylinders to be relieved and thereby reducing the braking effort. This cycle of operation is repeated at short intervals until the tendency for the wheel to lock disappears, whereupon the three-position valve is then moved to another position in which the brake fluid pumped by the hydraulic pump is fed back to the wheel cylinders, thereby gradually increasing the hydraulic pressure therein and the braking force.

One of the disadvantages of this known antiskid braking system is that it uses an electric motor to drive the hydraulic pump. Since the hydraulic pump requires a large amount of power, it has been necessary to use an electric motor having relatively large size and weight.

The use of electric motor has given rise to another problem. Since by its very nature, the electric motor is unsuitable for being driven intermittently at very short time intervals, it has been necessary to continuously energize the motor throughout a braking period of the vehicle, which, in turn, entailed that the hydraulic pump be continuously operated. This causes "kick back" of the brake pedal due to the pumping of the brake fluid back to the master cylinder, as explained later in more detail.

The above-mentioned braking system also uses a three-position solenoid valve, such as that described in Japanese Utility Model publication No. 58-17169, for controlling the hydraulic pressure at the wheel cylinders. It has been recognized that this solenoid valve is disadvantageous in that it is large in size and complex in structure, because it has three positions; a first or normal position, a second or intermediate position, and a third or extreme position. Furthermore, when the valve is to be held in the intermediate position, the valve must be energized by a control signal having an intermediate intensity. This requires the supply current to be limited thereby limiting the responsiveness of the solenoid valve, and hence, of the braking system.

SUMMARY OF THE INVENTION

The object of the present invention is to overcome the foregoing disadvantages by providing an improved antiskid braking system which is free from the problem of brake pedal kick-back and which consists of component parts that are small in size and light in weight and have improved responsiveness.

According to the invention, there is provided an antiskid hydraulic braking system including a master cylinder connected through a main hydraulic conduit to a wheel cylinder. The wheel cylinder is, in turn, connected through a relief conduit to a brake fluid reservoir which is, in turn, connected through a supply conduit to the wheel cylinder. A normally open solenoid-operated first shutoff valve is provided in the main hydraulic conduit and is adapted to be closed during application of the brake whenever there is a tendency for the brake to lock the associated wheel. This valve closure interrupts the communication between the master cylinder and the wheel cylinder and precludes further transmission of the hydraulic pressure generated in the master cylinder to the wheel cylinder. A normally-closed solenoid-operated second shutoff valve is placed in the relief conduit connecting the wheel cylinder with the reservoir. The second shutoff valve is opened to relieve the hydraulic pressure in the wheel cylinder until the tendency toward wheel lock disappears. An intermittently operable high speed pump is provided in the supply conduit to feed the brake fluid under pressure to the wheel cylinder once the hydraulic pressure in the wheel cylinder is reduced to a level low enough to obviate wheel lock.

The use of an intermittently operable high speed pump, instead of the conventional hydraulic pump continuously driven by an electric motor, enables the pump to be operated intermittently in a step-by-step manner until hydraulic pressure is restored in the wheel cylinder at a level sufficient to develop the required braking force. In this manner, it is possible to operate the braking system without kick-back of the brake pedal. Also, the use of intermittently operable hydraulic pump enables the use of a solenoid operated shutoff valve in place of the conventional three-position valve. This is advantageous because a solenoid operated shutoff valve is compact in size and light in weight and is capable of being operated by a high power electric current, thereby considerably improving the responsiveness.

The intermittently operable high speed hydraulic pump may preferably comprise a piezoelectric pump having a pump plunger reciprocated by a piezoelectric drive having a stack of piezoelectric elements. Since a piezoelectric element develops stress instantaneously upon variation in the voltage applied thereon, a piezoelectric drive is most suitable for repeated intermittent high speed operation of the hydraulic pump. However, due to the limited amount of expansion and contraction of the stack of piezoelectric elements, it is essential that, for a piezoelectric pump to operate at a high pumping efficiency, an adequately high preloading is imparted to the stack of piezoelectric elements. According to the feature of the present invention, the pump plunger has a small diameter head defining a pumping chamber and a large diameter base defining a delivery chamber. The brake fluid pressurized in the pumping chamber is forwarded through an inner passage in the pump plunger to the delivery chamber. The fluid under pressure in the delivery chamber acts on the large diameter base of the pump plunger, causing it come into pressure contact with the stack of piezoelectric elements whereby the stack is hydraulically preloaded.

DESCRIPTION OF THE PREFERRED EMBODIMENTS

Figure 1:
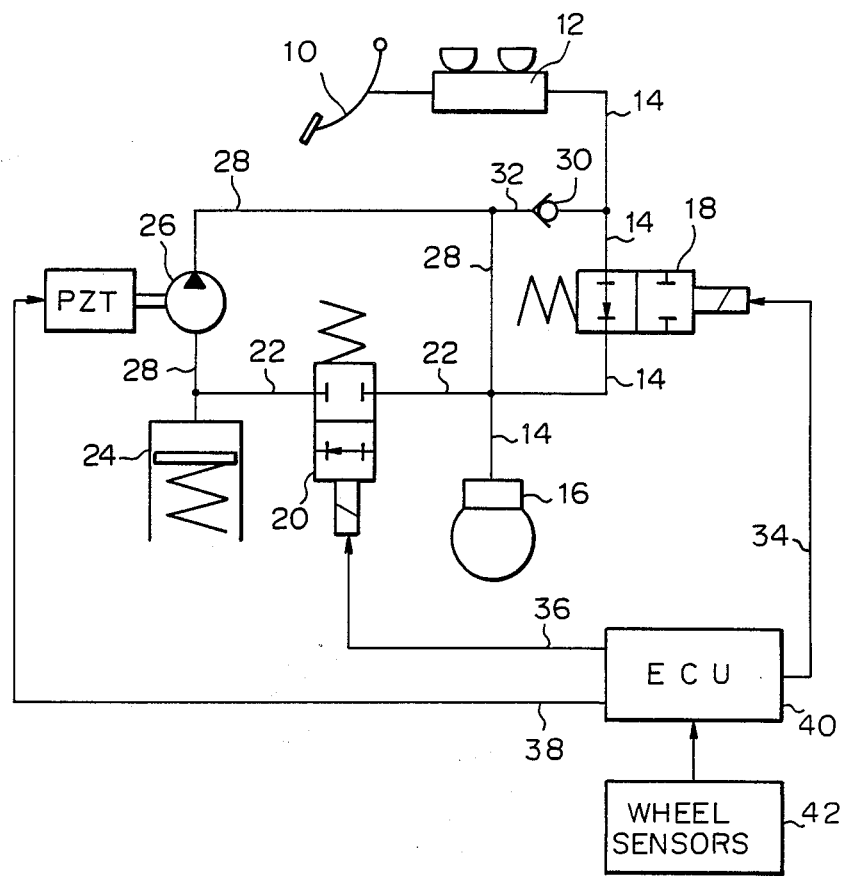
FIG. 1 is a schematic representation of the antiskid braking system according to the invention.

Referring to the drawings, FIG. 1 shows a general layout of the antiskid braking system of the invention. A brake pedal 10 is linked to a hydraulic master cylinder 12 to generate hydraulic pressure upon actuation of the brake pedal 10. The master cylinder 12 is connected through a main hydraulic conduit 14 to a wheel cylinder 16 which is operatively associated in the conventional manner with a brake of a wheel. Although in FIG. 1 only one wheel cylinder 16 is shown for simplicity, the main conduit 14 may feed four or more wheel cylinders. Similarly, a tandem master cylinder unit may be used which is connected to two independent main conduits feeding two associated groups of wheel cylinders, respectively.

Figure 2:
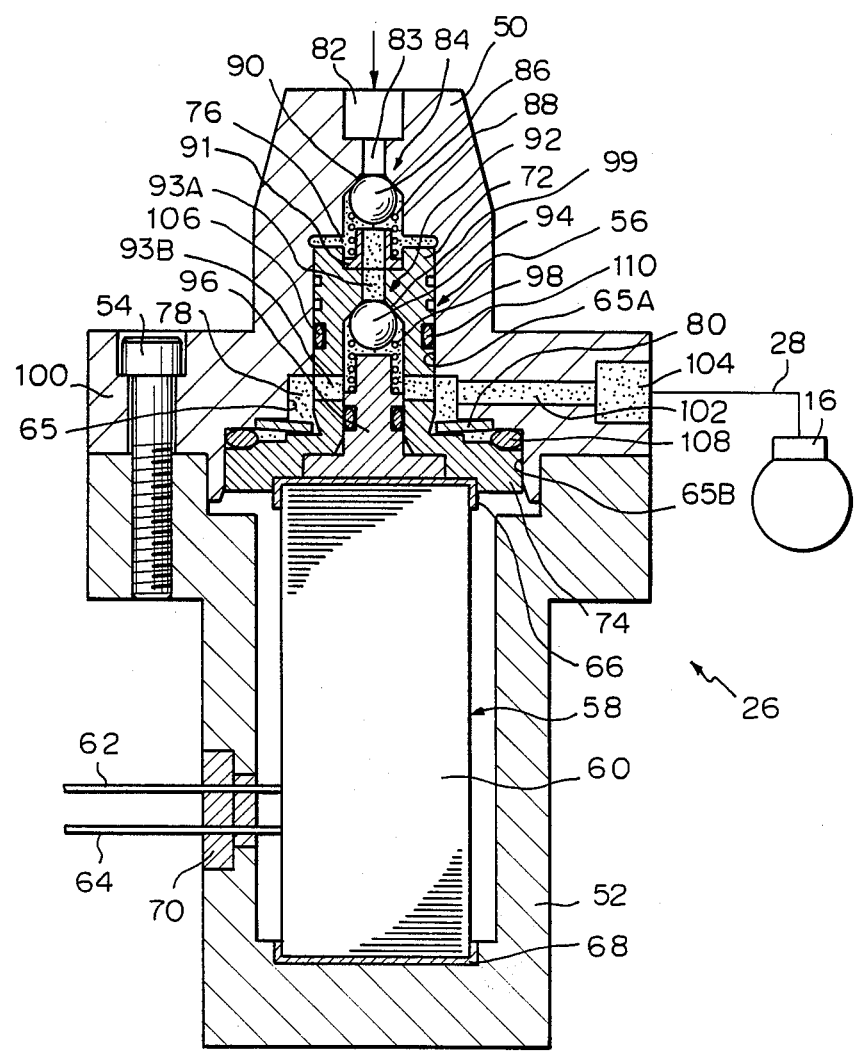
FIG. 2 is a cross-sectional view of a piezoelectric pump according to the invention.

A normally-open solenoid-operated first shutoff valve 18 is provided in the main hydraulic conduit 14 for ON/OFF control of the communication between the master cylinder 12 and the wheel cylinder 16. The wheel cylinder 16 is connected through a relief conduit 22 to a brake fluid reservoir 24 which is adapted to store the brake fluid under a pressure of several atmospheres. A normally-closed solenoid-operated second shutoff valve 20 is provided in the relief conduit 22 to control the release of brake fluid from the wheel cylinder 16 to the reservoir 24. The reservoir 24 is, in turn, connected through a supply conduit 28 to the wheel cylinder 16. A piezoelectric pump 26, the structure of which will be described later in detail with reference to FIG. 2, is placed in the supply conduit 28 in such a manner that, upon operation thereof, the brake fluid stored in the reservoir 24 is drawn therefrom and is pumped under pressure to the wheel cylinder 16. The supply conduit 28 and the main conduit 14 are preferably communicated with each other by a return conduit 32 having a check valve 30, so that upon release of the brake pedal 10 any amount of brake fluid stored in the reservoir is returned through the conduit 32 back to the master cylinder 12. The first and second solenoid valves 18 and 20 and the piezoelectric pump 26 are connected, respectively, by lines 34, 36, and 38 to an electronic control unit (ECU) 40, which may be a programmed conventional digital computor and which controls the valves 18 and 20 and the pump 26 in response to signals from conventional wheel sensors 42.

The antiskid braking system shown in FIG. 1 basically operates as follows. When the vehicle operator presses down the brake pedal 10 to apply the brake, hydraulic pressure generated in the master cylinder 12 is transmitted via the main conduit 14 through the normally open first shutoff valve 18 to the wheel cylinder 16, thereby exerting a braking force on the vehicle wheel. Where the hydraulic pressure applied to the wheel cylinder is too high or the road surface has a low coefficient of friction, the brake will lock the wheel causing the wheel to skid, resulting in a longer braking distance and failure of steerability of the vehicle. This is obviated in the following manner.

When in response to signals from the wheel sensors 42 the control unit 40 senses a tendency for the wheel to lock due to the hydraulic pressure in the wheel cylinder, and hence, that the braking force is too high with respect to the road surface conditions, the control unit 40 switches the first shutoff valve 18 from its normally open position to a closed position, thereby interrupting the application of a hydraulic pressure in the master cylinder 12 to the wheel cylinder 16. Then, the control unit 40 determines whether the locking tendency still exists, and if so, opens the normally closed second shutoff valve 20 to relieve the pressure in the wheel cylinder 16 toward the reservoir 24 until the wheel cylinder pressure becomes low enough to reduce to braking force to such a level that the locking tendency disappears. Thereafter, the second shutoff valve 20 is returned to its normally closed position to hold the wheel cylinder pressure, and the control unit 40 operates to determine the revolutional speed of the wheel. If the speed of the wheel becomes too high, then the piezoelectric pump 28 is repeatedly actuated intermittently, whereby the brake fluid is drawn from the reservoir 24 and is fed under pressure to the wheel cylinder 16, thereby increasing the hydraulic pressure therein and the braking force. When a locking tendency of wheel is sensed, then the piezoelectric pump is stopped and the first and the second valves 18 and 20 and the pump 20 await the next control commands from the control unit 40. In this manner, the vehicle is braked without causing wheel lock and wheel skid.

Now the construction and operation of the piezoelectric pump 26 as well as the features thereof will be described in detail with reference to FIG. 2. The piezoelectric pump 26 comprises a body consisting of an upper body 50 and a lower body 52 which are made of, for example, steel, and are fastened together hermetically by a plurality of bolts, one of which is shown at 54. The upper body 50 primarily serves as a cylinder for slidably receiving a pump plunger 56, whereas the lower body 52 is primarily intended to receive a piezoelectric drive 58.

The piezoelectric drive 58 may be of the type well known in the art and comprises a stack 60 of piezoelectric discs made from a piezoelectric material such as lead zirconate titanate (PZT). The stack 60 may include, for example, one hundred thin piezoelectric discs, which are arranged alternately with opposite polarities. The discs are interleaved by foil electrodes (not shown) which are alternately connected to a plus lead line 62 and a minus lead line 64. Upon application of a voltage of about 500 V, the stack 60 of the piezoelectric drive 58 will expand axially by about 50 $\mu$m. The piezoelectric stack 60 is held between upper and lower insulators 66 and 68. An electrically non-conductive medium such as silicone oil is filled in the inner space of the lower body 52 to ensure electrical insulation and cooling of the piezoelectric drive. The plus and minus lead lines 62 and 64 extend liquid tightly through an insulating plug 70 and are connected to the electronic control unit 40.

The upper body 50 forming the pump cylinder is provided with a stepped bore 65 having a small diameter bore portion 65A and a large diameter bore portion 65B. The pump plunger 56 comprises a small diameter head 72 slidably and closely fitted within the small diameter bore portion 65A to define a pumping chamber 76 therebetween. The plunger 56 further includes a large diameter base 74 which is slidably and closely fitted within the large diameter bore portion 65B to define a delivery or pressure chamber 78. The pump plunger 56 is urged against the piezoelectric stack 60 by a Belleville spring 80 mounted between the plunger base 74 and a shoulder in the stepped bore 54. The spring 80 serves to hold the plunger 56 in pressure contact with the stack 60 as well as to impart a certain preload thereon. Since the amount of expansion of the piezoelectric stack 60 is very small, it is most desirable that preloading of the stack 60 be as high as possible, to ensure that the pump plunger 56 is reciprocated with a maximum stroke and that the piezoelectric pump 26 operates with a maximum pumping efficiency. As described later, the delivery chamber 78 serves as an additional means for preloading the piezoelectric stack 60 by making use of the delivery pressure of the pump 26 itself.

The upper body 50 is provided with an inlet 82 which receives the brake fluid from the reservoir 24. The inlet 82 is connected through a passage 83 with a first check valve 84 to the pumping chamber 76. The check valve 84 includes a check ball 86 which is biased against an associated valve seat 90 by a spring 88 bearing on a spring retainer 91 seated on the plunger head 72. The pumping chamber 76 is connected to the delivery chamber 78 through an axial passage 93A with a second check valve 92 and through a plurality of radial passages 93B. A check ball 94 of the second check valve 92 is biased against a valve seat 99 by a spring 98 supported at its lower end by a spring seat 96 mounted within the pump plunger 56. The delivery chamber 78 is in fluid communication with an outlet 104 through a radial outlet passage 102 formed in a flange 100 of the upper body 50. The outlet 104 may be connected to the wheel cylinder 16 via the supply conduit 28. In order to ensure a fluid-tight seal of the pumping chamber 76, an O-ring 106 is mounted in a circumferential groove formed in the outer periphery of the plunger head 72. Similarly, an O-ring 108 is provided between a shoulder of the stepped bore 65 and the upper surface of the plunger base 74, to prevent leakage of the brake fluid in the delivery chamber 78 into the inner cavity of the lower body 52. Further, an O-ring 110 is mounted in an annular groove formed on the circumferential periphery of the spring seat 96.

The operation of the piezoelectric pump 26 will be described below in connection with the operation of the antiskid braking system. As will be understood from the foregoing description, the piezoelectric pump 26 is not operated during a normal braking condition in which the braking system functions without causing wheel lock. When the brake pedal 10 is actuated to apply the brake, the master cylinder 12 generates a pressure of, for example, 100 atms, which is transmitted to the wheel cylinder 16. The pressure at the wheel cylinder 16 is transmitted through the supply conduit 28 to the outlet 104 of the piezoelectric pump 26, and the pressure at the outlet 104 is, in turn, transmitted through the outlet passage 102 to the delivery chamber 78. As the check ball 94 of the check valve 92 is urged against its cooperating valve seat 99 under the action of differential pressure, and thus the communication between the delivery chamber 78 and the pumping chamber 76 is interrupted, the hydraulic pressure in the delivery chamber 78 acts upon the plunger base 74 to bring it into pressure contact with the piezoelectric stack 60. Therefore, the piezoelectric stack 60 is held under a preload depending on the hydraulic pressure prevailing in the delivery chamber 78.

During an abnormal condition wherein the vehicle wheel tends to lock, the first solenoid valve 18 is closed and the second solenoid valve 20 opened to relieve the hydraulic pressure in the wheel cylinder as described hereinbefore. When, as a result of the reduction in the brake force the revolutional speed of the wheel becomes too high, the electronic control unit 40 starts to operate the piezoelectric pump 26 in order to restore the wheel cylinder pressure. This operation is accomplished as follows. First, a high tension voltage of 500 V is applied between the lead lines 62 and 64 of the piezoelectric drive 58 to expand the piezoelectric stack 60. Upon application of the voltage, expansion of the stack takes place almost instantaneously, i.e., in most cases within several microseconds. This causes the pump plunger 56 to move upward within about 1 millisecond from voltage application. Due to the movement of the pump plunger, the volume of the pumping chamber 76 is reduced whereby the brake fluid in the pumping chamber 76 is pressurized at an elevated pressure and is forced to flow through the check valve 92 into the delivery chamber 78, and thence through the outlet passage 102 to the outlet 104. It should be noted that, prior to the first delivery stroke of the pumping plunger 56, the hydraulic pressure in the wheel cylinder 16 has been reduced to such a moderate level that wheel lock is prevented, and accordingly, the hydraulic pressure in the delivery chamber 78 serving to preload the piezoelectric electric stack 60 has been correspondingly reduced to thereby preload the stack to only a limited degree. However, since the delivery pressure of the piezoelectric pump 26 must be higher than the pressure in the wheel cylinder 16, the pump plunger 56 is able to effectively perform its initial delivery stroke despite the moderate preloading of the piezoelectric stack 60.

Then, the piezoelectric drive 58 is de-energized, allowing the piezoelectric stack to contract to its initial length and thus permitting the pump plunger 56 to return to the lower position under the action of the spring 80 and the fluid pressure in the delivery chamber 78. This causes the pumping chamber 76 to expand, bringing about a negative pressure therein, so that the brake fluid stored in the reservoir under a pressure of several atmospheres is drawn through the first check valve 84 into the pumping chamber 76. During this intake stroke of the pumping plunger 56, the check ball 94 of the second check valve 92 is tightly urged against its associating valve seat 99 under the action of the spring 98 and the differential pressure developed between the pumping chamber 76 and the delivery chamber 78. In this manner, upon application and release of the voltage to the piezoelectric drive 58, the piezoelectric stack 60 undergoes one cycle of expansion and contraction, causing the pump plunger to perform one cycle of delivery and intake strokes so that a predetermined quantity of brake fluid is drawn from the reservoir 24 and is pumped to the wheel cylinder 16.

The application and release of voltage may be repeated at a frequency of about 100 Hz and the piezoelectric pump 26 is actuated for a required time period as determined by the electronic control unit 40. That is, cyclic operation of the piezoelectric pump 26 is continued until the control unit 40 again senses a tendency toward wheel lock caused by an increase in the braking effort as result of a restoration of hydraulic pressure in the wheel cylinder 16. Upon the recurrence of a wheel lock tendency, actuation of the piezoelectric pump is immediately stopped and the hydraulic pressure in the wheel cylinder is maintained as is. The solenoid valves 18 and 20 and the piezoelectric pump 26 then stand by for the next instructions from the electronic control unit 40. It has been recognized that it is usually sufficient to select the dimensions of the piezoelectric pump 26 in such a manner that a delivery rate of from 2 to 4 cm$^3$/sec is obtained.

It should be appreciated that, as the hydraulic pressure in the wheel cylinder is stepped up for each cycle of actuation of the piezoelectric pump 26, the piezoelectric stack 60 of the pump is subjected to an increasing preloading due to the increasing pressure in the delivery chamber 78. Therefore, it is possible to obtain an optimal pumping efficiency of the piezoelectric pump over the whole range of the delivery pressure.

Figure 3:
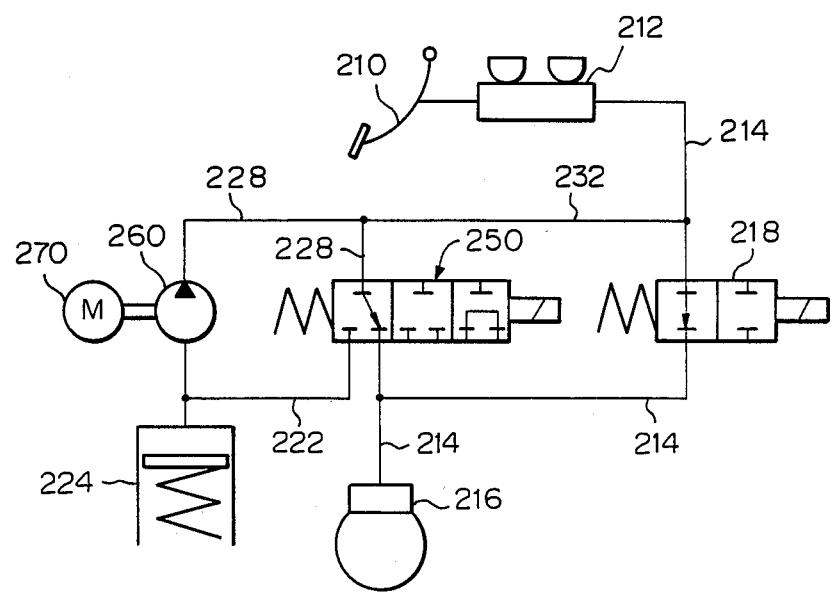
FIG. 3 is a schematic representation of the conventional antiskid braking system.

The structural and operational features of the antiskid braking system according to the invention described above will be more readily understood when compared with the conventional antiskid braking system illustrated in FIG. 3. In FIG. 3, equivalent parts are indicated by like reference numerals. The conventional system includes a brake pedal 210, a master cylinder 212, a main hydraulic conduit 214, a wheel cylinder 216, and an electronically controlled shutoff valve 218. The wheel cylinder 216 is connected through a relief conduit 22 to a reservoir 224 which is, in turn, connected through a supply conduit 228 to the wheel cylinder. A return conduit 232 connects the main conduit 214 and the supply conduit 228. A solenoid operated three-position valve 250, such as that described in Japanese Utility Model Publication No. 58-17169, is provided to control the hydraulic pressure in the wheel cylinder. A hydraulic pump 260 driven by DC motor 270 is positioned in the supply conduit 228. The three-position valve 250 has a first position in which the hydraulic pump 260 is connected to the wheel cylinder 216, a second intermediate position in which the wheel cylinder is isolated from both the reservoir 224 and the pump 260, and a third extreme position in which the wheel cylinder is connected to the reservoir to relieve the pressure in the wheel cylinder.

In this conventional system, the DC motor 270 is energized as soon as the wheel lock tendency is sensed. However, due to the large inertia of the DC motor, about 50 milliseconds must elapse before the pump 260 starts to deliver the brake fluid under a desired pressure, so that the responsiveness of the antiskid braking system is limited. In contrast, the system according to the invention uses a piezoelectric pump 26 having a piezoelectric drive which responds very rapidly, i.e., within several microseconds, upon voltage application so that pumping stroke of the pump plunger takes place within about 1 millisecond. Therefore, it is possible to control the wheel cylinder pressure with a considerably higher responsiveness.

Furthermore, the DC motor, by its very nature, can not feasibly be intermittently operated at very short intervals. This means that the DC motor must be continuously energized during operation of the antiskid braking system, so that the hydraulic pump is continuously driven to deliver the brake fluid under pressure. As a result, the three-position valve 250 is essential, in order to eventually interrupt the communication between the continuously driven pump and the wheel cylinder and to prevent an excessive amount of brake fluid from being pumped into the wheel cylinder. As mentioned hereinbefore, the three-position valve is disadvantageous that it is very heavy and has a complex design. Moreover, the presence of an intermediate position in the valve hampers operation at the increased electric current required for high responsiveness. According to the present invention, the antiskid braking system requires only ON/OFF or shutoff valves, which have a simple construction and are light in weight and suitable for high speed operation at a large electric current.

Another problem encountered in the conventional system is the "kick-back" of the brake pedal. As well be understood from FIG. 3, the three-position valve 250 must be brought to the intermediate position once the hydraulic pressure is restored in the wheel cylinder. With the three-position valve in this position, the pressurized brake fluid from the continuously driven pump is forwarded through the return conduit 232 to the master cylinder, thereby causing kick-back of the brake pedal. The antiskid braking system according to the invention is entirely free from this problem. When the first solenoid valve 18 is closed in response to the detection of wheel lock tendency, the hydraulic pressure developed in the master cylinder 12 in proportion to the force applied to the brake pedal is retained in the portion of the main conduit 14 located between the master cylinder 12 and the shutoff valve 18 due to the provision of the check valve 30 in the return conduit 32. Since the piezoelectric pump 26 is actuated only after the wheel cylinder pressure is reduced to a low level such that the wheel lock tendency is overcome and, therefore, the hydraulic pressure at the wheel cylinder is much higher than the hydraulic pressure at the wheel cylinder as long as the vehicle operator continues to press on the brake pedal, the piezoelectric pump 26 pumps the brake fluid into the wheel cylinder 16 without opening the check valve 30. In this manner, the hydraulic pressure in the wheel cylinder 16 is increased to a desired level without allowing the pressure fluctuation, caused by cyclic operation of the piezoelectric pump, to be transmitted toward the master cylinder 12 and without allowing the pumped brake fluid to flow into the master cylinder 12. Thus, the antiskid braking system of the invention operates without kick back of the brake pedal.

Although the present invention has been described herein with reference to specific embodiments thereof, it should be understood that the invention is not limited thereby and various changes and modifications may be made therein without departing from the scope of the present invention. For example, the piezoelectric drive has been described as having a stack of piezoelectric discs. However, th piezoelectric drive may comprise one or more monolithic columns of piezoelectric material. Furthermore, other types of intermittently operable high speed hydraulic pump such as a solenoid operated pump may be used.

We claim:

1. An antiskid hydraulic braking system for a vehicle having a wheel with a brake, which comprises:
   a hydraulic master cylinder operated by a vehicle operator;

a wheel cylinder operatively associated with said brake:

a main hydraulic conduit for transmitting hydraulic pressure generated in said master cylinder to said wheel cylinder, to apply the brake;

a normally-open solenoid-operated first shutoff valve, disposed in said main conduit, for controlling a transmission of hydraulic pressure therethrough, said first valve being operable to be closed when a tendency that the brake is about to lock the wheel occurs upon application of the brake by the operator;

a reservoir for storing brake fluid;

a relief conduit connecting said wheel cylinder with said reservoir;

a normally-closed solenoid-operated second shutoff valve disposed in said relief conduit, said second valve being operable to be opened to relieve hydraulic pressure in said wheel cylinder when a tendency toward wheel lock remains even after closure of said first valve, thereby causing braking effort of the brake to be reduced until the tendency toward wheel lock disappears;

a supply conduit connecting said reservoir with said wheel cylinder; and an intermittently operable electrically operated high speed pump disposed in said supply conduit for pressurizing the brake fluid in said reservoir and supplying pressurized brake fluid directly to said wheel cylinder, said pump being operated when the hydraulic pressure in said wheel cylinder is decreased by said opening of said second shutoff valve.

2. An antiskid hydraulic braking system according to claim 1, wherein said pump comprises a piezoelectric pump having a stack of piezoelectric elements and wherein said piezoelectric pump comprises means for preloading said stack of piezoelectric elements in response to a delivery pressure of the pump.

3. An antiskid hydraulic braking system according to claim 2, wherein said pump comprises:

a body having an axially extending closed-end stepped bore, said bore having a small diameter bore portion and a large diameter bore portion coaxial with each other;

a moveable pumping plunger slidably received in said body, said plunger having a small diameter head closely fitted within said small diameter bore portion and a large diameter base integral with said plunger head and closely fitted within said large diameter bore portion;

means for defining a pumping chamber in said body between said plunger head and said small diameter bore portion;

means for defining an annular delivery chamber in said body between said plunger base and said large diameter bore portion;

piezoelectric drive means disposed coaxially with said pump plunger between said plunger base and said body for reciprocating said plunger in response to variations in applied electric potential, said piezoelectric drive means including a stack of piezoelectric elements;

inlet passage means in said body for admitting the brake fluid from said reservoir into said pumping chamber;

a first check valve in said inlet passage to block the brake fluid from flowing therethrough in a reverse direction;

inner passage means in said pump plunger for communicating the pumping chamber with said delivery chamber;

a second check valve in said inner passage for compelling the brake fluid to flow therethrough only in the direction from said pumping chamber to said delivery chamber;

outlet passage means for discharging the brake fluid from said delivery chamber, said outlet passage means being connected through said supply conduit to said wheel cylinder; and mechanical means for biasing said pump plunger into contact with said stack of piezoelectric elements to impart a predetermined preload thereon.

4. In combination with a vehicle hydraulic braking system including a brake actuating member, a master cylinder for generating hydraulic pressure in response to actuation of said actuating member, a wheel cylinder operatively associated with a brake of a vehicle wheel, and a main hydraulic conduit for transmitting the hydraulic pressure generated in said master cylinder to said wheel cylinder to apply the brake, an antilock control system comprising:

a normally-open solenoid-operated first shutoff valve disposed in said main conduit for controlling transmission of hydraulic pressure therethrough;

a reservoir for storing a brake fluid in said braking system;

a relief conduit connecting said wheel cylinder with said reservoir;

a normally-closed solenoid-operated second shutoff valve disposed in said relief conduit for controlling a relief of brake fluid from said wheel cylinder;

a supply conduit connecting said reservoir with said wheel cylinder;

a piezoelectric pump disposed in said supply conduit for drawing the brake fluid in said reservoir, pressurizing the brake fluid and delivering the pressurized brake fluid directly to said wheel cylinder; and control means responsive to a locking tendency of the wheel for controlling said first shutoff valve, said second shutoff valve and said piezoelectric pump, said control means being operable to close said normally open first shutoff valve in response to a tendency of the wheel to lock upon initial application of the brake thereby interrupting transmission of hydraulic pressure from said master cylinder to said wheel cylinder, said control means operating to open said normally closed second shutoff valve in response to a continuation of said tendency toward wheel lock even after closure of said first shutoff valve, thereby relieving the hydraulic pressure in said wheel cylinder until said tendency toward wheel lock disappears, said control means being operable to thereafter energize said piezoelectric pump to restore increased hydraulic pressure in said wheel cylinder when said pressure in said wheel cylinder is caused to decrease by the opening of said second shutoff valve.

5. An antiskid hydraulic braking system for a vehicle having a wheel with a brake, which comprises:

a hydraulic master cylinder operated by a vehicle operator;

a wheel cylinder operatively associated with the brake;

a main hydraulic conduit for transmitting hydraulic pressure generated in said master cylinder to said wheel cylinder to apply the brake;

a normally-open solenoid-operated first shutoff valve disposed in said conduit for controlling a transmission of hydraulic pressure therethrough, said first valve being operable to be closed when a tendency that the brake is about to lock the wheel occurs upon application of the brake by the operator;

a reservoir for storing a brake fluid;

a relief conduit connecting said wheel cylinder with said reservoir;

a normally-closed solenoid-operated second shutoff valve disposed in said relief conduit, said second valve being operable to be opened to relieve hydraulic pressure in said wheel cylinder when a tendency toward wheel lock remains even after closure of said first valve, thereby causing braking effort of the brake to be reduced until the tendency toward wheel lock disappears;

a supply conduit connecting said reservoir with said wheel cylinder; and an intermittently operable electrically operated high speed pump disposed in said supply conduit for pressurizing the brake fluid in said reservoir and forwarding it to said wheel cylinider, said pump being intermittently operated until the hydraulic pressure in said wheel cylinder is increased to a level at which the brake is about to lock the wheel, wherein said pump is a piezoelectric pump having a stack of piezoelectric elements, said piezoelectric pump comprising:

means for preloading said stack of piezoelectric elements in response to a delivery pressure of the pump;

a body having an axially extending closed-end stepped bore, said bore having a small diameter bore portion and a large diameter bore portion coaxial with said small diameter bore portion;

a moveable pumping plunger slidably received in said body, said plunger having a small diameter head closely fitted within said small diameter bore portion and a large diameter base integral with said plunger head and closely fitted within said large diameter bore portion;

means for defining a pumping chamber in said body between said plunger head and said small diameter bore portion;

means for defining an annular delivery chamber in said body between said plunger base and said large diameter bore portion;

piezoelectric drive means disposed coaxially with said pump plunger between said plunger base and said body for reciprocating said plunger in response to variations in applied electric potential, said piezoelectric drive means including a stack of piezoelectric elements;

inlet passage means in said body for admitting the brake fluid from said reservoir into said pumping chamber;

a first check valve in said inlet passage to block the brake fluid from flowing therethrough in a reverse direction;

inner passage means in said pump plunger for communicating said pumping chamber with said delivery chamber;

a second check valve in said inner passage for compelling the brake fluid to flow therethrough only in a direction from said pumping chamber to said delivery chamber;

outlet passage means for discharging the brake fluid from said delivery chamber, said outlet passage means being connected through said supply conduit to said wheel cylinder; and mechanical means for biasing said pump plunger into contact with said stack of piezoelectric elements to impart a predetermined preload thereon.

6. An antiskid hydraulic braking system according to claim 5, further comprising on additional conduit, with a check valve, connecting the portion of said supply conduit located between said pump and said wheel cylinder with the portion of said main conduit located between said master cylinder and said first solenoid operated shutoff valve for allowing the brake fluid in said reservoir to be returned to said master cylinder upon release of the brake.

* * * * *